US009647941B2

(12) United States Patent
Sun (10) Patent No.: US 9,647,941 B2
(45) Date of Patent: May 9, 2017

(54) HIERARCHICAL HASHING FOR LONGEST PREFIX MATCHING

(71) Applicant: BROADCOM CORPORATION, Irvine, CA (US)

(72) Inventor: Yan Sun, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 241 days.

(21) Appl. No.: 14/046,889

(22) Filed: Oct. 4, 2013

(65) Prior Publication Data

US 2015/0098470 A1 Apr. 9, 2015

(51) Int. Cl.
*H04L 12/743* (2013.01)
*H04L 12/745* (2013.01)

(52) U.S. Cl.
CPC ........ *H04L 45/7453* (2013.01); *H04L 45/748* (2013.01)

(58) Field of Classification Search
CPC .................................................... H04L 45/748
See application file for complete search history.

(56) References Cited

U.S. PATENT DOCUMENTS

| 6,792,423 | B1 * | 9/2004 | Jeffries | ............. | G06F 17/30985 |
| 7,805,427 | B1 * | 9/2010 | Depelteau | ......... | G06F 17/30327 |
| | | | | | 707/706 |
| 2004/0255045 | A1 * | 12/2004 | Lim et al. | ..................... | 709/245 |
| 2005/0175010 | A1 * | 8/2005 | Wilson | ................ | H04L 12/4625 |
| | | | | | 370/392 |
| 2005/0195832 | A1 * | 9/2005 | Dharmapurikar et al. | ......................... | 370/395.31 |
| 2006/0083247 | A1 * | 4/2006 | Mehta | ..................... | H04L 45/00 |
| | | | | | 370/395.32 |
| 2006/0198379 | A1 * | 9/2006 | Cadambi | ................. | H04L 45/00 |
| | | | | | 370/395.32 |
| 2006/0200581 | A1 * | 9/2006 | Cadambi | .......... | H04L 29/12801 |
| | | | | | 709/245 |
| 2008/0101372 | A1 * | 5/2008 | Brown et al. | ................. | 370/392 |

(Continued)

OTHER PUBLICATIONS

Rasmussen et a. TCAM-based High Speed Longest Prefix Matching with Fast Incremental Table Updates. IEEE. DOI: 10.1109/HPSR. 2013.6602288, pp. 43-48; Jul. 2013*

(Continued)

*Primary Examiner* — Jeffrey M Rutkowski
*Assistant Examiner* — Andre Tacdiran
(74) *Attorney, Agent, or Firm* — McDermott Will & Emery LLP (57) ABSTRACT

A system for hierarchical hashing for longest prefix matching may include a memory and a processor. The memory may be configured to store hash tables that include prefixes and associated next hop information, where the hash tables are associated with lengths of the prefixes and at least one of the hash tables is associated with a range of lengths of the prefixes. The processor may be configured to determine a destination address associated with a packet received over a first port, determine next hop information associated with a longest prefix that matches the destination address by searching at least a first hash table of the hash tables that stores a largest number of the prefixes relative to the hash tables, and prepare the packet for transmission over a second port that is determined based at least on the next hop information.

21 Claims, 8 Drawing Sheets

(56) References Cited

U.S. PATENT DOCUMENTS

| | | | |
|---|---|---|---|
| 2010/0040067 A1* | 2/2010 | Hao | H04L 45/00 370/395.32 |
| 2013/0246651 A1* | 9/2013 | Keen | H04L 45/748 709/238 |
| 2014/0006706 A1* | 1/2014 | Wang | 711/108 |

OTHER PUBLICATIONS

Lim, et al., "Priority Tries for IP Address Lookup," IEEE Transactions on Computers, Jun. 2010, pp. 784-794, vol. 59, No. 6.

Varghese, "Network Algorithmics: An Interdisciplinary Approach to Designing Fast Networked Devices," 2005, Morgan Kaufmann Publishers.

Eatherton, et al., "Tree Bitmap: Hardware/Software IP Lookups with Incremental Updates," ACM SIGCOMM Computer Communication Review, Apr. 2004, pp. 97-122, vol. 34, No. 2.

Waldvogel, et al., "Scalable High Speed IP Routing Lookups," ACM SIGCOMM Computer Communication Review, Oct. 1997, pp. 25-36, vol. 27, No. 4.

Nilsson, et al., "IP-address Lookup Using LC-Tries," IEEE Journal on Selected Areas in Communications, Jun. 1999, pp. 1083-1092, vol. 17, No. 6.

Wuu, et al., "A Longest Prefix First Search Tree For IP Lookup," Computer Networks, Aug. 2007, pp. 3354-3367, vol. 51, Issue 12.

Sun, et al., "A Hybrid Approach to CAM-Based Longest Prefix Matching for IP Route Lookup," Global Telecommunications Conference, 2010.

Hsiao, et al., "A High Throughput And High-Capacity IPv6 Routing Lookup System," Computer Networks, Feb. 2013, pp. 782-794, vol. 57, Issue 3.

"AS6447 IPv6 BGP Table Data," Sep. 2013, <http://bgp.potaroo.net/v6/as6447>.

AS6447 BGP Routing Table Analysis Report, Jun. 2013, <http://bgp.potaroo.net/as6447>.

"University of Oregon Route Views Project," University of Oregon, visited Sep. 2013, <http://www.routeviews.org>.

Pong, "Concise Lookup Tables for IPv4 and IPv6 Longest Prefix Matching In Scalable Routers," IEEE/ACM Transactions on Networking, Jun. 2012, pp. 729-741, vol. 20, No. 3.

Chang, et al., "A Fast And Memory Efficient Dynamic IP Lookup Algorithm based on B-Tree," Proceedings of International Conference on Advanced Information Networking and Applications, May 2009, pp. 278-284.

Sangireddy, et al., "Scalable, Memory Efficient, High-Speed IP Lookup Algorithms," IEEE/ACM Transactions on Networking, Aug. 2005, pp. 802-812, vol. 13, No. 4.

Gupta, "Address Lookup and Classification," Netlogic Microsystems, May 23, 2006.

"Hash table" From Wikipedia, the free encyclopedia, modified Sep. 10, 2013.

"Longest prefix match," From Wikipedia, the free encyclopedia, modified Mar. 7, 2013.

"Routing table," From Wikipedia, the free encyclopedia, modified Aug. 1, 2013.

Nilsson, et al., "Fast IP routing with LC-Tries," Dr. Dobbs The World of Software Development, Aug. 1998, < http://www.drdobbs.com/cpp/fast-ip-routing-with-lc-tries/184410638 >.

Waldvogel, et al., "Scalable High Speed IP Routing Lookups," Washington University Computer Science Department Slide Presentation, Mar. 24, 1998, <http://www.arl.wustl.edu/~jst>.

Wuu, et al., "A Longest Prefix First Search Tree For IP Lookup," IEEE 2005, pp. 989-993.

* cited by examiner

| IP address | Mask | Next hop (Port) |
|---|---|---|
| 167.19.0.0 | 16 | 1 |
| 202.104.1.0 | 24 | 2 |
| 202.113.8.0 | 24 | 3 |
| 202.104.1.0 | 25 | 4 |
| 202.104.1.3 | 27 | 5 |
| 202.104.1.12 | 28 | 6 |
| 202.104.1.25 | 32 | 7 |

HIERARCHICAL HASHING FOR LONGEST PREFIX MATCHING

TECHNICAL FIELD

The present description relates generally to longest prefix matching and, in particular, relates to hierarchical hashing for longest prefix matching.

BACKGROUND

The rapid growth of the internet has led to an increased demand for devices that can perform high speed packet forwarding, such as high performance routing devices. These routing devices receive packets and determine the appropriate next hop, e.g. output port, for the received packets. The appropriate output port is generally determined by performing an address lookup on a routing table, e.g. an internet protocol (IP) address lookup, with respect to the destination address of the packet. The routing table may include a prefix corresponding to each destination subnet and a next hop for delivering the packet to its intended destination. Since the prefix for each entry in the routing table may specify a network, the destination address may match more than one entry in the routing table, e.g. a network, a subnet of the network, etc. However, the most specific table entry that matches the destination address, e.g. the entry for which the largest number of leading address bits, e.g. most significant address bits, in the table entry match those of the destination address, should be the table entry that is selected for the packet, and may be referred to as the longest prefix match for the destination address.

The algorithm used by a routing device to determine the longest prefix match may contribute significantly to the latency of the routing device, and may even be a bottleneck for the routing device. Benchmarks used to measure the performance of an algorithm used by a routing device to determine the longest prefix match may include the number of memory accesses needed by the algorithm to identify the longest prefix match (in the worst and average cases), and the memory consumption needed by the algorithm to store and process the routing table. One algorithm that may be used by a routing device to determine the longest prefix match is a tree bitmap (TBMP) algorithm. In the TBMP algorithm, prefixes of a routing table are stored in a tree bitmap data structure that is searched for the longest prefix match. The tree bitmap data structure is searched in an order that starts with the shortest stored prefix and traverses down to the longest prefixes. Thus, the TBMP algorithm may require more memory accesses to match a longer prefix to a given packet's destination address than to match a shorter prefix. Another algorithm that may be used is a binary hash searching on prefix length (BSOL) algorithm. In the BSOL algorithm, prefixes of a routing table are hashed into hash tables that are associated with the length of the prefixes and that are subsequently searched for the longest prefix match. The BSOL algorithm may associate one hash table with each prefix length; thus, the memory consumption of the BSOL algorithm may increase significantly for large routing tables with prefixes having many different lengths.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for hierarchical hashing for longest prefix match, prefixes and next hop information of a routing table are hashed into hash tables that are associated with a range of prefix lengths, such as (for IPv4) a hash table associated with prefix lengths of 8-15 bits, a hash table associated with prefix lengths of 16-23 bits, a hash table associated with prefix lengths of 24-31 bits, and a hash table associated with a prefix length of 32 bits. Since the subject system associates each hash table with a range of prefix lengths, as opposed to a single prefix length (as is done by the BSOL algorithm), the subject system reduces the memory consumption and the pre-computation cost as compared to the BSOL algorithm. The subject system may also provide a simpler searching guide, and a more efficient update, than the BSOL algorithm.

The subject system searches the hash tables associated with the prefix lengths starting with the hash table that stores the greatest number of prefixes. For example, the majority of prefixes stored in IPv4 routing tables may typically be 24-31 bits in length. Thus, for these routing tables, the subject system may start by searching the hash table associated with prefix lengths of 24-31 bits, which has a high likelihood of including the longest prefix match. Since the subject system searches for the longest prefix match based at least on the distribution of the prefix lengths of the routing table, as opposed to searching from the smallest prefix to the longest prefixes (as is done by the TBMP algorithm), the subject system may achieve fewer worst case and average case memory accesses than the TBMP algorithm. The subject system may also be easier to implement than systems utilizing the TBMP algorithm, and may provide better scalability in routing table size and IP address length.

Figure 1:
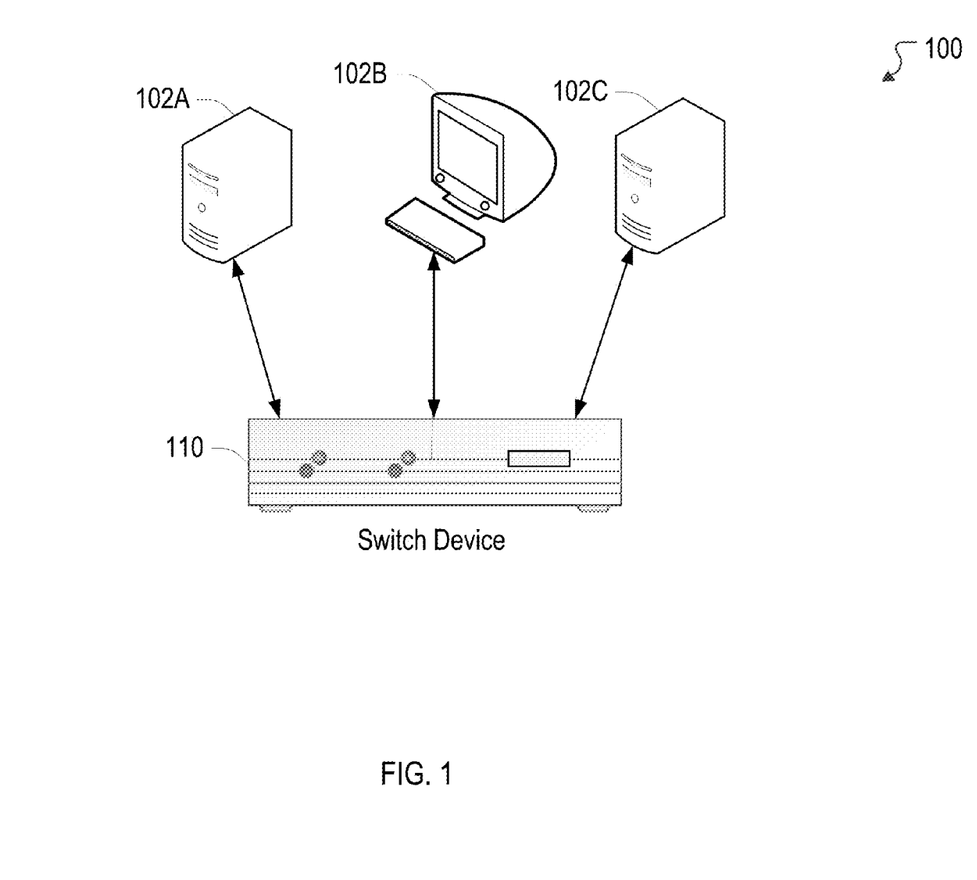
FIG. 1 illustrates an example network environment in which a system for hierarchical hashing for longest prefix matching may be implemented in accordance with one or more implementations.

FIG. 1 illustrates an example network environment 100 in which a system for hierarchical hashing for longest prefix matching may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 may include various electronic devices 102A-C such as one or more servers, computers, network components, network devices, etc. In one or more implementations, one or more of the electronic devices 102A-C may represent a set of servers, a server bank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as the network device 110, may be implemented to facilitate communication between the one or more electronic devices 102A-C of the network environment 100. The electronic devices 102A-C of the network environment 100, may be connected or otherwise in communication with each other, through or using the network device 110. For example, the electronic devices 102A-C may each be coupled to a physical port of the network device 110 by a network transmission line, such as an Ethernet transmission line, a coaxial transmission line, an optical transmission line, or generally any transmission line. In one or more implementations, one or more of the electronic devices 102A-C may be wirelessly coupled to the network device 110.

The network device 110 may be a switch device, routing device, such as any layer 3 routing device, or generally any network device that routes data, such as packets. The network device 110 may include one or more memory modules that store a routing table. The routing table may include a list of prefixes that correspond to destination subnets and the associated next hop information that indicates the address of the next device that a received packet should be sent to on its way to its final destination. An example routing table is discussed further below with respect to FIG. 5, and an example network device 110 is discussed further below with respect to FIG. 2. The network device 110 and/or one or more of the electronic devices 102A-C, may be, or may include one or more components of, the electronic system discussed below with respect to FIG. 8.

The electronic devices 102A-C transmit packets to the network device 110. The packets may each include a destination address, such as a destination internet protocol (IP) address. For example, headers of the packets may include the destination addresses of the packets. The network device 110 receives the packets, retrieves the next hop information for the packets from the routing table based at least on the destination addresses of the packets, and routes the packets based at least on the next hop information.

In one or more implementations, the prefixes and next hop information of the routing table of the network device 110 are hashed into hash tables that are associated with a range of prefix lengths, e.g. using 8-bit strides, such as a hash table associated with prefix lengths of 8-15 bits for IPv4, a hash table associated with prefix lengths of 16-23 bits for IPv4, a hash table associated with prefix lengths of 24-31 bits for IPv4, and a hash table associated with a prefix length of 32 bits for IPv4. For explanatory purposes, the subject system is described in the context of IPv4 addresses; however, the subject system may be implemented using IPv6 addresses, e.g. using hash tables and 16-bit strides. For example, a given prefix may be hashed into the hash table that is associated with the length of the prefix. An example data architecture of a routing table that includes hash tables associated with prefix lengths is discussed further below with respect to FIG. 6 and an example process for populating and/or updating a routing table that includes hash tables associated with prefix lengths is discussed further below with respect to FIG. 4.

In one or more implementations, for the hash tables that are not associated with the longest possible prefix of the routing table, e.g. 32 bits for IPv4 and 128 bits for IPv6, a hash value is stored in the hash table for a prefix that has the shortest prefix length associated with the hash table (e.g. 24 bits for a hash table associated with prefix lengths of 24-31 bits). The hash value may be a data structure, such as a linked list, that includes one or more of the following fields: the prefix string of the prefix, a prefix data structure, a next hop information data structure, and a next list node pointer. The prefix string and the next list node pointer may be included in the data structure to implement a chaining (linked list) mechanism for reducing collisions, e.g. collisions between prefixes having the same length. The next hop information data structure may store next hop information corresponding to the bitmap, e.g. port numbers or rule numbers. In one or more implementations, the next hop information data structure may be an associated array.

The prefix data structure may be a data structure that represents other prefixes that share the prefix string of the prefix but have a length that is greater than the shortest prefix length associated with the hash table (e.g. 25-31 bit prefixes for the hash table associated with prefix lengths of 24-31 bits). For example, the hash table associated with prefix lengths of 24-31 bits may store a value corresponding to a prefix of 202.104.1.0/24, and the value may include a prefix data structure that stores prefixes of 202.104.1.0/24, 202.104.1.0/25, 202.104.1.3/27 and 202.104.1.12/28. In one or more implementations, the prefix data structure may be a bitmap, a binary tree, a ternary content-addressable memory (TCAM), or generally any data structure.

In one or more implementations, the prefix data structure and/or the next hop information data structure may be stored separately from the hash value, e.g. in a different data structure, a different memory module, and/or in a different type of memory. Thus, the hash value may include pointers for retrieving the prefix data structure and/or the next hop information data structure from the appropriate memory.

In one or more implementations, the hash value may also include an indicator, such as a bit flag, for indicating that there may be a longest prefix match in the hash table associated with the next longest prefix length. In one or more implementations, if the hash value includes a bitmap, the bit in index 254 may be set for a bitmap of the hash table associated with the prefix lengths of 8-15 bits to indicate that there may be a match in the hash table associated with prefix lengths of 16-23, the bit in index 254 may be set for a bitmap of the hash table associated with prefix lengths of 16-23 bits to indicate that there may be a match in the hash table associated with prefix lengths of 24-31 bits, and the bit in index 255 may be set for a bitmap of the hash table associated with prefix lengths of 24-31 bits to indicate that there may be a match in the hash table associated with prefix lengths of 32 bits.

In one or more implementations, for the hash table associated with the longest possible prefix length for the routing table, e.g. 32 bits for IPv4 or 128 bits for IPv6, a hash value stored in the hash table for a given prefix may include the next hop information for the prefix. In one or more implementations, if the hash table associated with the shortest prefix is searched last, e.g. a hash table associated with prefix lengths of 1-7 bits for IPv4 or a hash table associated with prefix lengths of 1-15 bits for IPv6, the hash table may include the next hop information for the prefix.

The order in which the hash tables are searched by the network device 110 for the longest prefix match may be configurable and may be determined based on the number of prefixes stored in each of the hash tables. In one or more implementations, the first searched hash table may be referred to as a layer 1 hash table, the next searched hash table may be referred to as a layer 2 hash table, etc. In this nomenclature, a higher layer hash table with respect to a given hash table may refer to a hash table that is searched before the given hash table in the order and a lower layer hash table may refer to a hash table that is searched after the given hash table in the order.

In one or more implementations, the network device 110 may search the hash table that stores the largest number of prefixes first, and the network device 110 may then consecutively search the hash table storing the next shortest prefix than the previously searched hash table until the longest matching prefix is found. In one or more implementations, the network device 110 may first search the hash table associated with prefix lengths of 24-31 bits (for IPv4), then the hash table associated with prefix lengths of 16-23 bits, followed by the hash table associated with prefix lengths of 8-15 bits, and last the hash table associated with prefix lengths of 1-7 bits. The network device 110 may search the hash table associated with the longest possible prefix length for the routing table, e.g. 32 bits for IPv4, if an indicator of a hash value of the hash table associated with the prefix lengths of 24-31 bits indicates that a longest prefix match may exist in the hash table associated with the longest possible prefix length.

In one or more implementations, the order in which the hash tables are searched, e.g. the hash table that is searched first, may be configurable, e.g. when the distribution of prefix lengths of the routing table changes. In one or more implementations, if the order in which the hash tables are searched changes thereby changing the layers associated with the hash tables, the hash tables may need to be repopulated, e.g. to account for the change in the layers.

In operation, the network device 110 determines the destination address of a received packet, and determines the first hash table to search, e.g. the hash table associated with the prefix length, or range of prefix lengths, corresponding to the largest number of prefixes of the routing table. The network device 110 may search the determined hash table using the most significant bits of the destination IP address corresponding to the shortest prefix length associated with the determined hash table. For example, the network device 110 may search the hash table associated with prefix lengths of 24-31 bits using the 24 most significant bits of the destination IP address.

If the hash table does not return a value, the network device 110 searches the hash table associated with the next smallest prefix lengths, using the appropriate number of most significant bits of the destination address. If the hash table returns a hash value, e.g. the aforementioned data structure, the network device 110 determines whether the hash value includes an indicator that indicates that there may be a longest prefix match in the hash table associated with the next longest prefix length. If the hash value includes an indicator that indicates that there may be a match in the hash table associated with to the next longest prefix length, the network device 110 searches the hash table associated with the next longest prefix length using the appropriate number of most significant bits of the destination address.

If the hash value does not indicate that there may be a match in the hash table associated with the next longest prefix length, or if a match is not found in the hash table associated with the next longest prefix length, the network device 110 determines whether the hash value includes a prefix data structure, such as a bitmap. If the hash value includes a prefix data structure, the network device 110 searches the prefix data structure using the entire destination address. If the destination address matches a prefix in the prefix data structure, a value returned by the prefix data structure for the longest matching prefix, e.g. an index, is used to retrieve the next hop information, e.g. port number or rule number, from the next hop information data structure, e.g. an associated result array. The next hop information is then used to appropriately route the packet. If the destination address does not match a prefix in the prefix data structure or if the hash value does not include a prefix data structure, the network device 110 searches the next lower layer hash table, e.g. the hash table associated with the next shortest prefix lengths. An example process for searching the hash tables is discussed further below with respect to FIG. 3.

Figure 2:
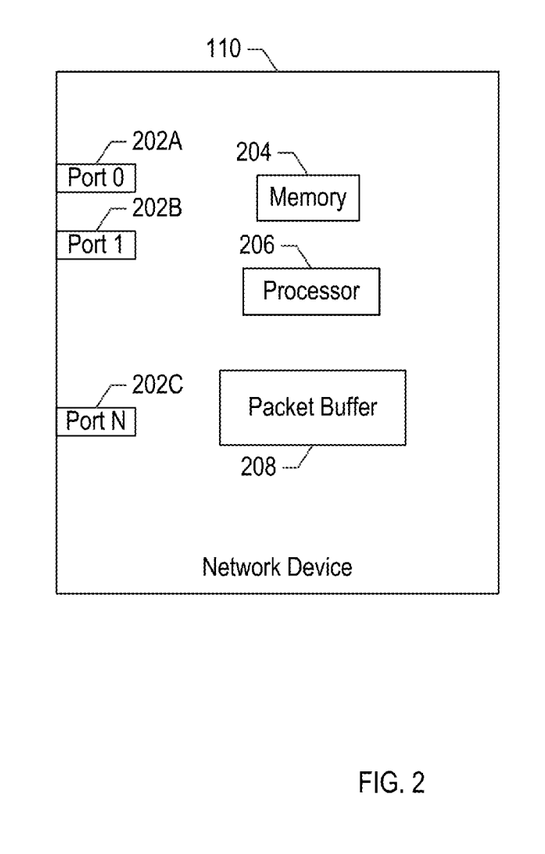
FIG. 2 illustrates an example network device that may implement a system for hierarchical hashing for longest prefix matching in accordance with one or more implementations.

FIG. 2 illustrates an example network device 110 that may implement a system for hierarchical hashing for longest prefix matching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 110 includes ports 202A-C, a memory 204, a processor 206, and a packet buffer 208. The memory 204 may store the routing table for the network device 110. For explanatory purposes the memory 204 is illustrated as a single block; however, the memory 204 may include one or more disparate memory modules and/or different types of memory modules, such as TCAM, random access memory (RAM), static random-access memory (SRAM), dynamic random-access memory (DRAM), double data rate synchronous dynamic random-access memory (DDR SDRAM). In one or more implementations, the entire routing table may be stored in one type of memory, such as SRAM. In one or more implementations, portions of the routing table may be stored in different types of memory. For example, the hash tables may be stored in SRAM, while the prefix data structures may be stored in TCAM. Thus, the hash values of the hash tables may include pointers to the prefix data structures stored in TCAM.

In one or more implementations, the processor 206 may be a network processor, such as a packet processor, and may be, or may include, a forwarding engine. In one or more implementations, the processor 206, or a portion thereof, may be implemented in software (e.g., subroutines and code). In one or more implementations, the processor 206, or a portion thereof, may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The ports 202A-C may be physical ports over which packets are received and transmitted, e.g. from/to electronic devices 102A-C. The packet buffer 208 may be one or more types of memory, such as DRAM, that store packets that are received/transmitted over the physical ports. In one or more implementations, a packet may be received over one of the ports 202A-C, e.g. the port 202A. The packet may be queued in the packet buffer 208, e.g. in an ingress queue, for processing by the processor 206. The processor 206 may retrieve the packet, and/or a header thereof, from the packet buffer 208 and may determine, e.g. based on the destination address of the packet and the routing table stored in the memory 204, the next hop for the packet, e.g. the port over which that the packet should be transmitted. The processor 206 may then queue the packet in a queue associated with the determined port, e.g. the port 202B, and the packet may be subsequently retrieved from the packet buffer 208 and transmitted over the port 202B.

Figure 3:
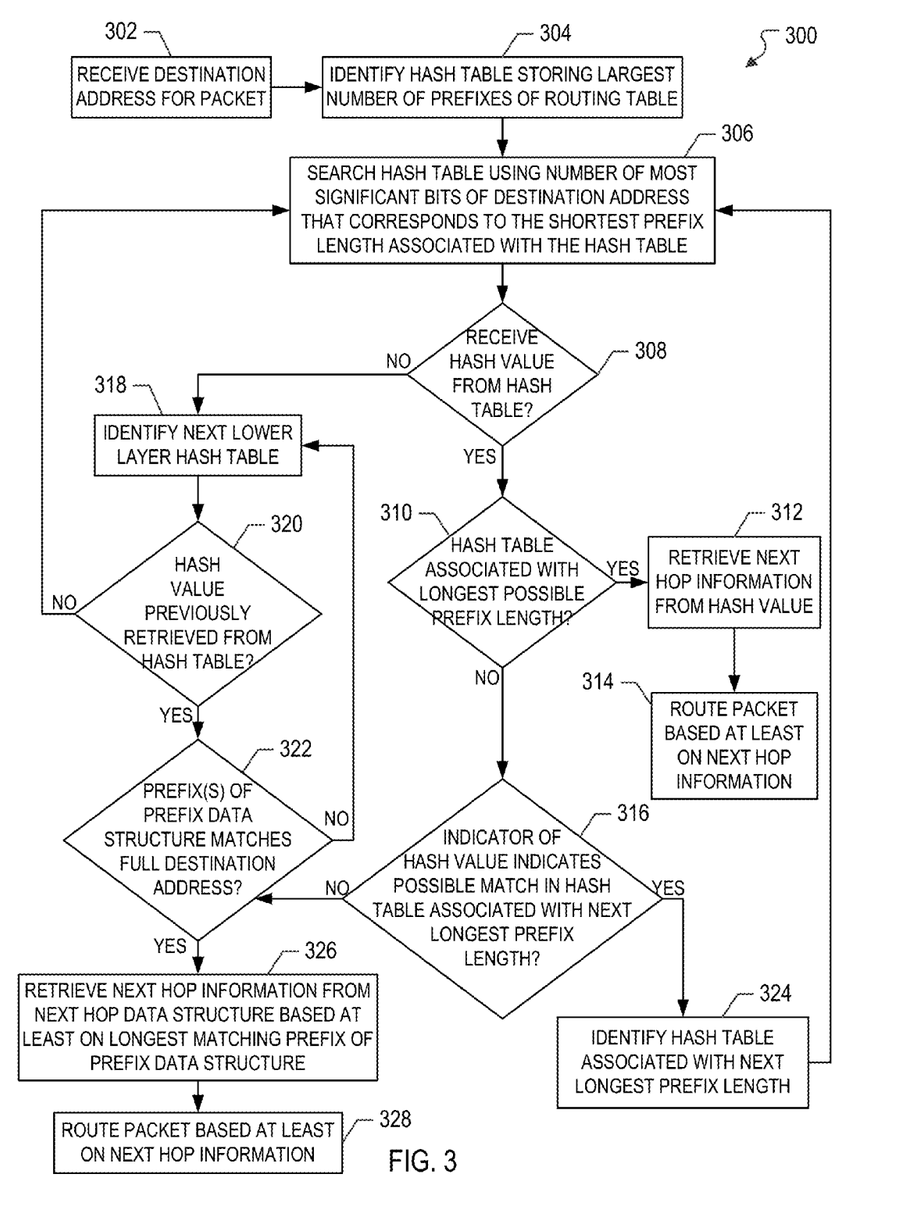
FIG. 3 illustrates a flow diagram of an example process for searching a routing table in a system for hierarchical hashing for longest prefix matching in accordance with one or more implementations.

FIG. 3 illustrates a flow diagram of an example process 300 for searching a routing table in a system for hierarchical hashing for longest prefix matching in accordance with one or more implementations. For explanatory purposes, the example process 300 is described herein with reference to the network device 110 of FIGS. 1 and 2; however, the example process 300 is not limited to the network device 110 of FIGS. 1 and 2, and the example process 300 may be performed by one or more components of the network device 110. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The processor 206 of the network device 110 receives a destination address for a received packet (302). For example, the processor 206 may process the header of the packet to retrieve the destination address. The processor 206 identifies a hash table stored in the memory 204 that is associated with a largest number of prefixes of the routing table of the network device 110 (304). In one or more implementations, the order in which the hash tables are searched may be stored, e.g. in the memory 204, and the processor 206 may identify the first hash table of the stored order (304).

The processor 206 searches the identified hash table using a portion of the destination address that includes the most significant bits of the destination address that correspond to the shortest prefix length that is associated with the hash table (306). For example, if the identified hash table stores prefixes having lengths of 24-31 bits, the processor 206 searches the hash table using the first 24 bits of the destination address, e.g. the 24 most significant bits. If the search returns a hash value from the hash table (308), the processor 206 determines whether the hash table is associated with the longest possible prefix length for the routing table, e.g. 32 bits for IPv4 (310). If the hash table is associated with the longest possible prefix length (310), the processor 206 retrieves the next hop information from the hash value (312) and routes the packet associated with the destination address based at least on the next hop information (314). For example, the next hop information may indicate a port that the packet should be transmitted over, and the processor 206 may prepare the packet for transmission over the port, e.g. by queuing the packet in a queue associated with the port.

If the hash table is not associated with the longest possible prefix length (310), the processor 206 determines whether an indicator, e.g. a bit flag, of the returned hash value indicates that the longest prefix match may exist in the hash table associated with the next longest prefix length of the routing table (316). For example, if the hash table is associated with prefix lengths of 24-31 bits (for IPv4), the hash table associated with the next longest prefix length may be the hash table associated with a prefix length of 32 bits. If the indicator of the hash value indicates that the longest prefix match may exist in the hash table associated with the next longest prefix length (316), the processor 206 identifies the hash table associated with the next longest prefix length (324) and searches the identified hash table (306).

If the indicator of the hash table does not indicate that the longest prefix match may exist in the hash table associated with the next longest prefix length (316), the processor 206 determines whether a prefix in the prefix data structure of the hash value matches the full destination address (322). For example, a prefix of the prefix data structure may match the full destination address if the entire prefix matches the corresponding most significant bits of the full destination address. If a prefix in the prefix data structure matches the full destination address (324), the processor 206 retrieves the next hop information from the next hop information data structure based at least on the longest matching prefix of the prefix data structure (326). For example, if more than one prefix of the prefix data structure matches the destination address, the next hop information is retrieved based on the matching prefix that has the longest length. In one or more implementations, if the prefix data structure is a bitmap and the next hop information data structure is an associated array, the index of the matching bit of the bitmap may be used to retrieve next hop information from the associated array. The processor 206 may then route the packet associated with the destination address based at least on the next hop information (328).

If none of the prefixes of the prefix data structure match the full destination address (322) or no hash value is returned from the hash table (308), the processor 206 identifies the next lower layer hash table (318), e.g. the next hash table to search. In one or more implementations, the next lower layer hash table may be the hash table associated with the next shortest prefix length. The processor 206 determines whether a hash value was previously retrieved from the next lower layer hash table (318). For example, if the hash table included an indicator that indicated that the longest prefix match may exist in the hash table associated with the next longest prefix length (316), but no match was found in the hash table associated with the next longest prefix length, then a hash value may have been previously retrieved from the hash table (320).

If a hash value was previously retrieved from the hash table (320), the processor 206 determines whether a prefix of the prefix data structure matches the full destination address (322), and proceeds as described above. If a hash value was not previously retrieved from the next lower layer hash table (320), the processor 206 searches the hash table (306), and proceeds as described above.

Figure 4:
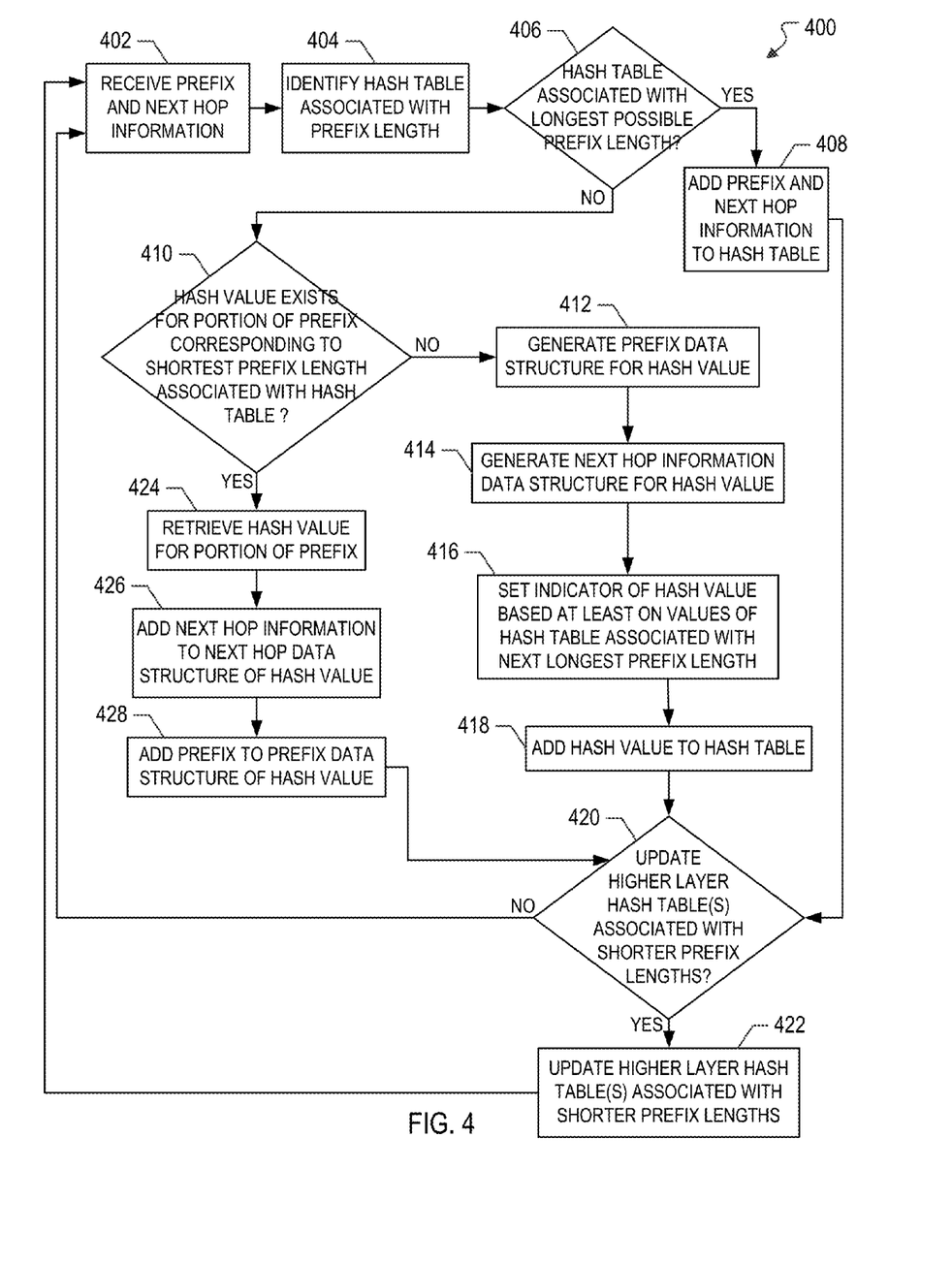
FIG. 4 illustrates a flow diagram of an example process for populating and/or updating a routing table in a system for hierarchical hashing for longest prefix matching in accordance with one or more implementations.

FIG. 4 illustrates a flow diagram of an example process 400 for populating and/or updating a routing table in a system for hierarchical hashing for longest prefix matching in accordance with one or more implementations. For explanatory purposes, the example process 400 is described herein with reference to the network device 110 of FIGS. 1 and 2; however, the example process 400 is not limited to the network device 110 of FIGS. 1 and 2, and the example process 400 may be performed by one or more components of the network device 110. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The processor 206 receives a prefix and the associated next hop information, such as a port number (402). For example, a user configuring the network device 110 may provide the prefix and the associated next hop information. The processor 206 identifies the hash table that is associated with the length of the received prefix (404). The processor 206 determines whether the identified hash table is associated with the longest possible prefix length of the routing table (406). For example, a 32-bit prefix may be the longest possible prefix length of the routing table for IPv4.

If the processor 206 determines that the identified hash table is associated with the longest possible prefix for the routing table (406), the processor 206 adds the prefix and the next hop information to the hash table (408). If the processor 206 determines that the identified hash table is not associated with the longest possible prefix length of the routing table (406), the processor 206 determines whether a hash value exists in the hash table for the portion of the prefix corresponding to the shortest prefix length associated with the hash table (410). For example, if the hash table is associated with prefix lengths of 24-31 bits, the processor 206 determines whether a hash value exists for the 24 most significant bits of the prefix.

If the processor 206 determines that the hash value exists (410), the processor 206 retrieves the hash value (424). The processor 206 then adds the next hop information to the next hop information data structure of the hash value (426) and adds the prefix to the prefix data structure of the hash value (428). In one or more implementations, the processor 206 may need to create the next hop information data structure and/or the prefix data structure for the hash value, e.g. if the data structures do not exist.

If the processor 206 determines that the hash value does not exist in the hash table (410), the processor 206 generates a prefix data structure that includes the received prefix (412), generates a next hop information data structure that includes the received next hop information (414), and sets an indicator to indicate whether a longest prefix match may exist in the hash table associated with the next longest prefix length (416). For example, the processor 206 may determine whether any prefixes exist in the hash table associated with the next longest prefix length that include the portion of the prefix. If any prefixes exist in the hash table associated the next longest prefix length, the processor 206 may set the indicator to indicate the same. Similarly, if no prefixes exist in the hash table associated with the next longest prefix length, the processor 206 may set the indicator to indicate the same.

The processor 206 then adds a hash value that includes the prefix data structure, the next hop information data structure, and the indicator to the hash table in association with the portion of the prefix that corresponds to the shortest prefix length associated with the hash table (418). For example, the processor 206 may pass the portion of the prefix through a hash function associated with the hash table. In one or more implementations, if the hash table is associated with the shortest possible prefix length for the routing table, e.g. 1-7 bits for IPv4, the hash value may only include the next hop information. In one or more implementations, the hash value may be a linked list and the prefix data structure, next hop information data structure, and indicator may be fields of the linked list. In one or more implementations, the hash value may include the portion of the prefix that corresponds to the shortest prefix length associated with the hash table and a next list node pointer. The portion of the prefix and the next list node pointer may be included in the hash value to implement a chaining (linked list) mechanism for reducing collisions in the hash table.

The processor 206 then determines whether one or more higher layer hash tables that are associated with shorter prefix lengths should be updated (420). For example, if a higher layer hash table, e.g. a hash table that will be searched prior to the identified hash table, is associated with shorter prefix lengths, an indicator of a hash value in the higher layer hash table may need to be set to indicate that a longest prefix match may exist in the identified hash table. If the processor 206 determines that one or more higher layer hash tables that are associated with shorter prefix lengths should be updated (420), the processor 206 updates the one or more higher layer hash tables associated with shorter prefix lengths (422) and then receives another prefix and next hop information (402), if any. If the processor 206 determines that no higher layer hash tables associated with shorter prefix lengths should be updated (420), the processor 206 receives another prefix and next hop information (402), if any.

Figure 5:
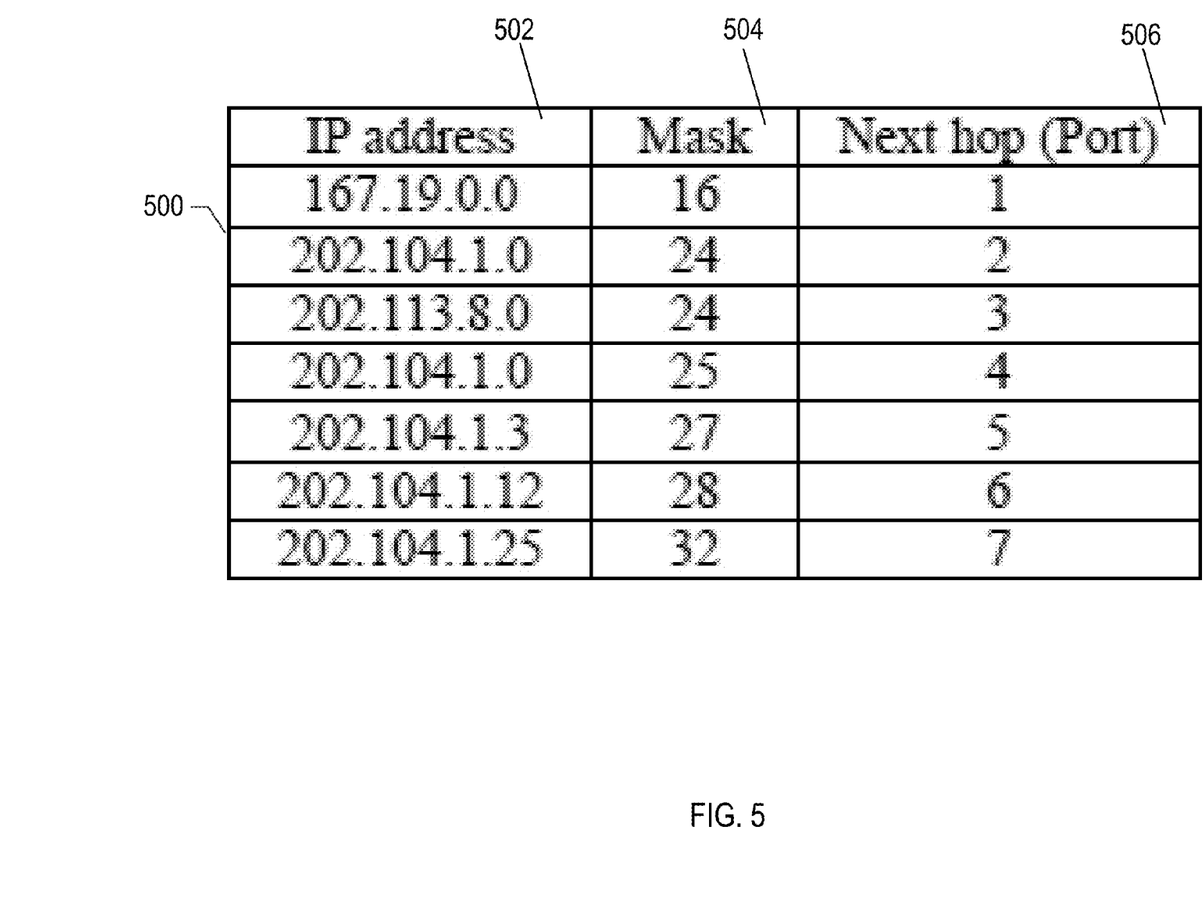
FIG. 5 illustrates an example routing table of a system for hierarchical hashing for longest prefix matching in accordance with one or more implementations.

FIG. 5 illustrates an example routing table 500 of a system for hierarchical hashing for longest prefix matching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example routing table 500 includes prefixes 502, prefix lengths 504, and next hop information 506. In operation, the processor 206 determines which of the hash tables to add the prefixes 502 to based at least on the prefix lengths 504. The processor 206 then adds the most significant bits of the prefixes 502 indicated by the prefix lengths 504 to the hash tables along with the associated next hop information 506.

Figure 6:
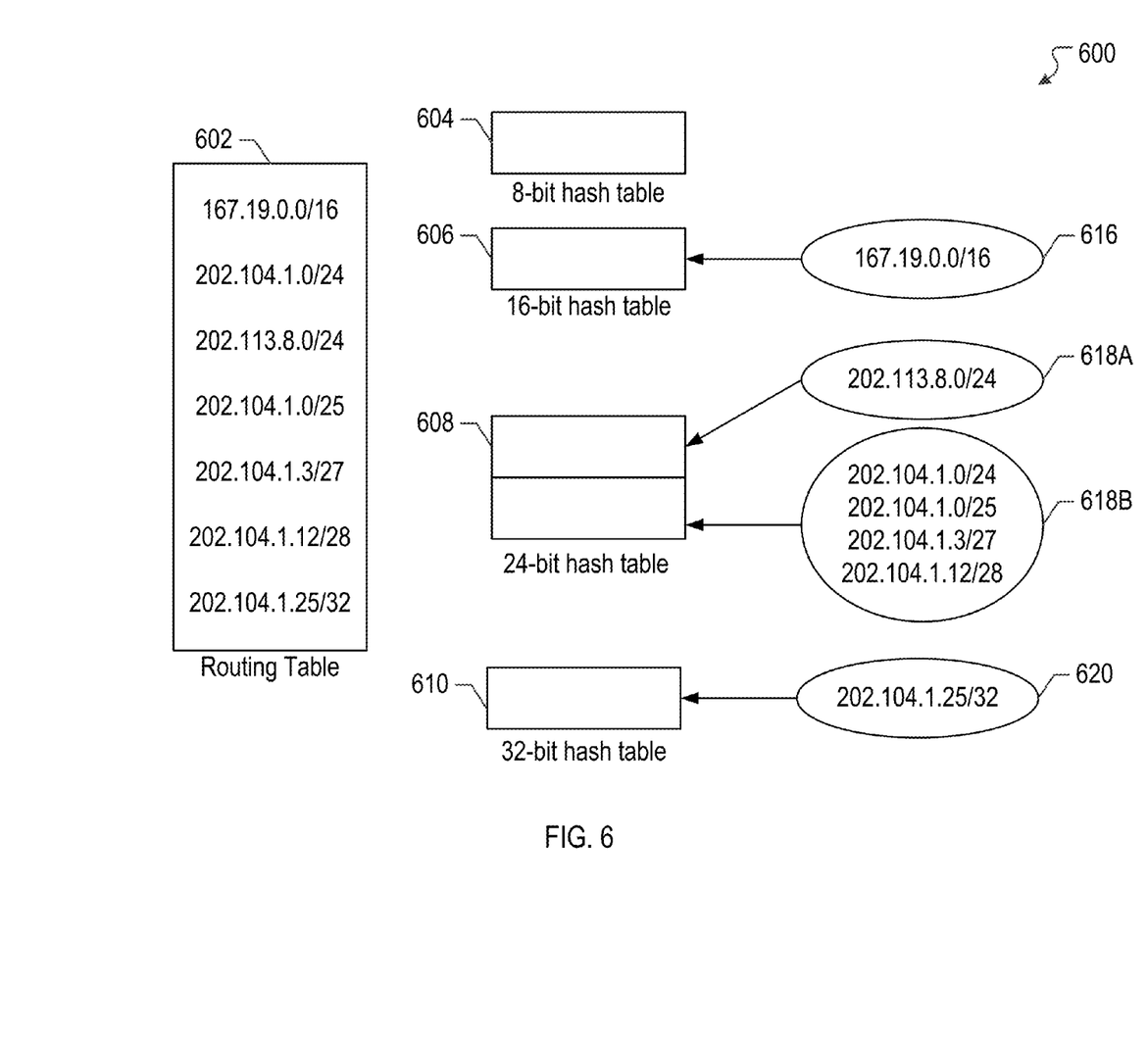
FIG. 6 illustrates an example data architecture for a routing table of a system for hierarchical hashing for longest prefix matching in accordance with one or more implementations.

FIG. 6 illustrates an example data architecture 600 for a routing table of a system for hierarchical hashing for longest prefix matching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The data architecture 600 is illustrated for IPv4, e.g. using 8-bit strides with a maximum prefix length of 32 bits. However, a similar architecture may be used for IPv6, e.g. using 16-bit strides with a maximum prefix length of 128 bits. The data architecture 600 includes a portion of a routing table 602, an 8-bit hash table 604, a 16-bit hash table 606, a 24 bit hash table 608, and a 32-bit hash table 610. The 16-bit hash table 606 includes one entry 616, the 24-bit hash table 608 includes two entries 618A-B, and the 32-bit hash table 610 includes one entry 620. The portion of the routing table 602 includes the prefixes 502 and the prefix lengths 504. The routing table 602 may further include next hop information, e.g. as illustrated in FIG. 5.

The 8-bit hash table 604 may store prefixes having lengths of 8-15 bits, the 16-bit hash table 606 may store prefixes having lengths of 16-23 bits, the 24-bit hash table 608 may store prefixes having lengths of 24-31 bits, and the 32-bit hash table 610 may store prefixes having lengths of 32-bits. As shown in FIG. 6, the 16-bit hash table 606 includes a single entry 616 and the 32-bit hash table 610 includes a single entry 620. However, the 24-bit hash table 608 includes two entries 618A-B.

The first entry 618A of the 24-bit hash table 608 includes a single prefix having a length of 24-bits, e.g. 202.113.8.0/24. The second entry of the 24-bit hash table 608 includes four prefixes having lengths that vary from 24-28 bits, e.g. 202.104.1.0/24, 202.104.1.0/25, 202.104.1.3/27, and 202.104.1.12/28. Thus, the prefix having a length that corresponds to the shortest prefix length associated with the 24-bit hash table 608, e.g. the 24-bit prefix, may be used as the key for the hash table. Thus, the key for the entry 618B in the 24-bit hash table 608 may be 202.104.1.0/24. The corresponding hash value may include a data structure, such as a bitmap, that represents all four of the prefixes, as is discussed further below with respect to FIG. 7. The hash value may further include a next hop information data structure, such as an associated array, that may store the next hop information corresponding to each of the prefixes of the entry 618B.

In addition, since the prefix of the entry 620 of the 32-bit hash table 610, e.g. 202.104.1.25/32, has the same most significant bits as the shortest prefix corresponding to the entry 618B, e.g. 201.104.1.0/24, an indicator of the hash value, such as a bit flag, is set to indicate that a longest prefix match may exist in the 32-bit hash table 610.

Figure 7:
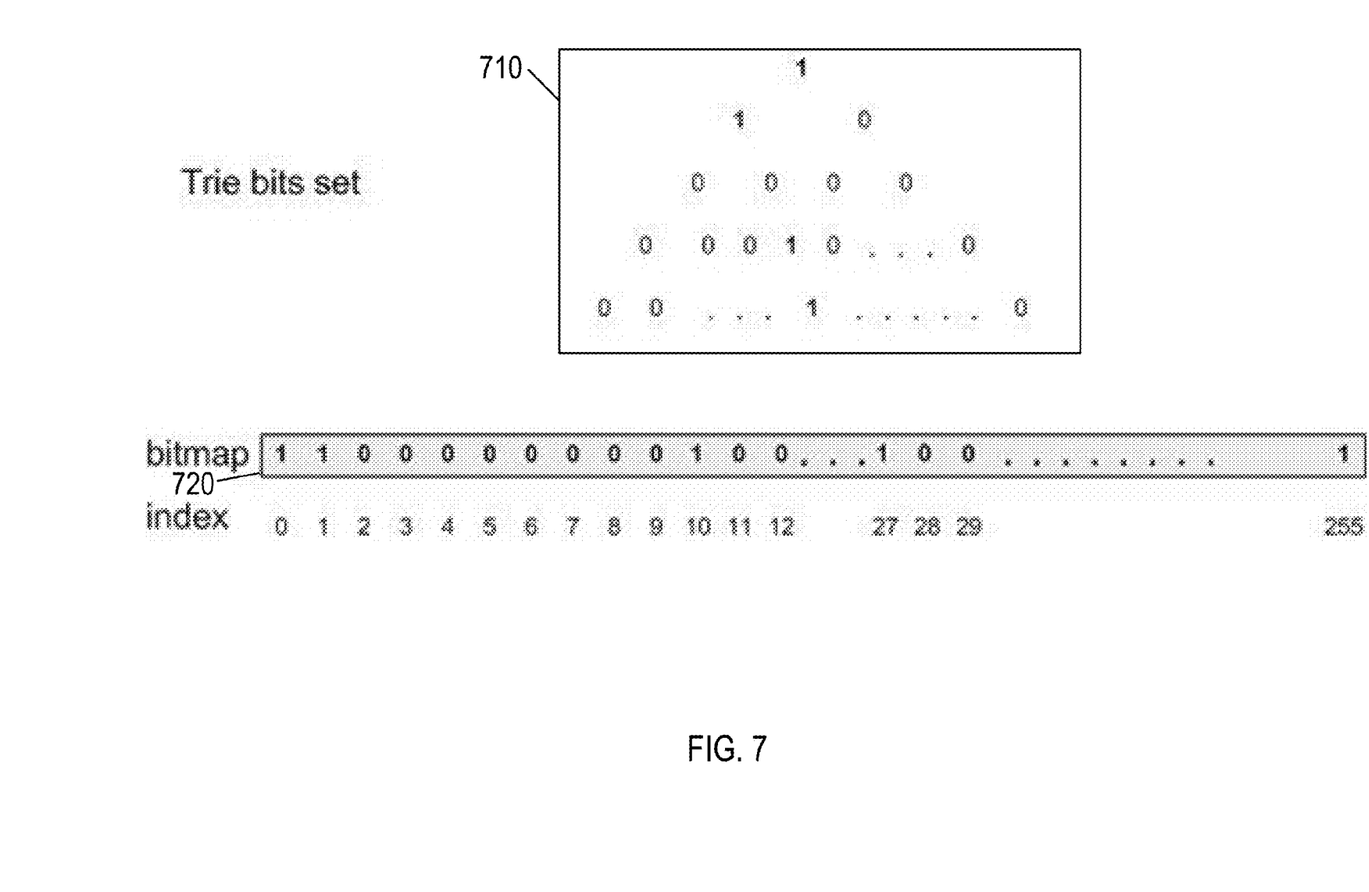
FIG. 7 illustrates an example prefix data representations of a system for hierarchical hashing for longest prefix matching in accordance with one or more implementations.

FIG. 7 illustrates an example prefix data representations of a system for hierarchical hashing for longest prefix matching in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example prefix data representations may include a trie bits set 710, and a bitmap 720. The root node of the trie bits set 710 may correspond to the zero-index value of the bitmap 720. The remaining nodes of the trie bits set 710 may correspond to the indexes of the bitmap 720 in a left-to-right and then top to bottom order. For example, the leftmost node of the second highest level of the trie bits set 710 may correspond to the one-index value of the bitmap 720, the rightmost node of the second highest level of the trie bits set 710 may correspond to the two-index value of the bitmap 720, the leftmost node of the third highest level of the trie bits set 710 may correspond to the four-index value of the bitmap 720, etc.

The trie bits set 710 and the bitmap 720 may represent the prefixes of the entry 618B of the 24-bit hash table 608 of FIG. 6. For example, the values of the trie bits set 710 and the bitmap 720 that are set to one each represent one of the prefixes of the entry 618B of the 24-bit hash table 608. The root of the trie bits set 710 may represent the shortest prefix of the entry 618B, e.g. the prefix of 202.104.1.0/24. A traversal of the trie bits set 710 to the left represents a bit value of 0, while a traversal to the right represents a bit value of 1. Thus, from the root node, e.g. representing the prefix of 202.104.1.0/24, a traversal to the left indicates another bit value of 0, e.g. the prefix of 202.104.1.0/25. Thus, the zero-index bit and the one-bit of the bitmap 720 are set to one for the prefix of 202.104.1.0/24 and the prefix of 202.104.1.0/25, respectively.

Two additional traversals from the right of the node that represents the prefix of 202.104.1.0/25 adds two more one bit values, giving a prefix of 202.104.1.3/27. Thus, the ten-index bit of the bitmap 720 is set to one for 202.104.1.3/27. One additional traversal from the right of the node that represents the prefix of 202.104.1.3/27, adds one additional bit value, giving the prefix of 202.104.1.12/28. Thus, the twenty-seven index bit of the bitmap 720 is to one for 202.104.1.12/28. In addition, the 255-index bit is set to one to indicate that there may be a longest prefix match in the 32-bit hash table 610, e.g. the entry 620.

Figure 8:
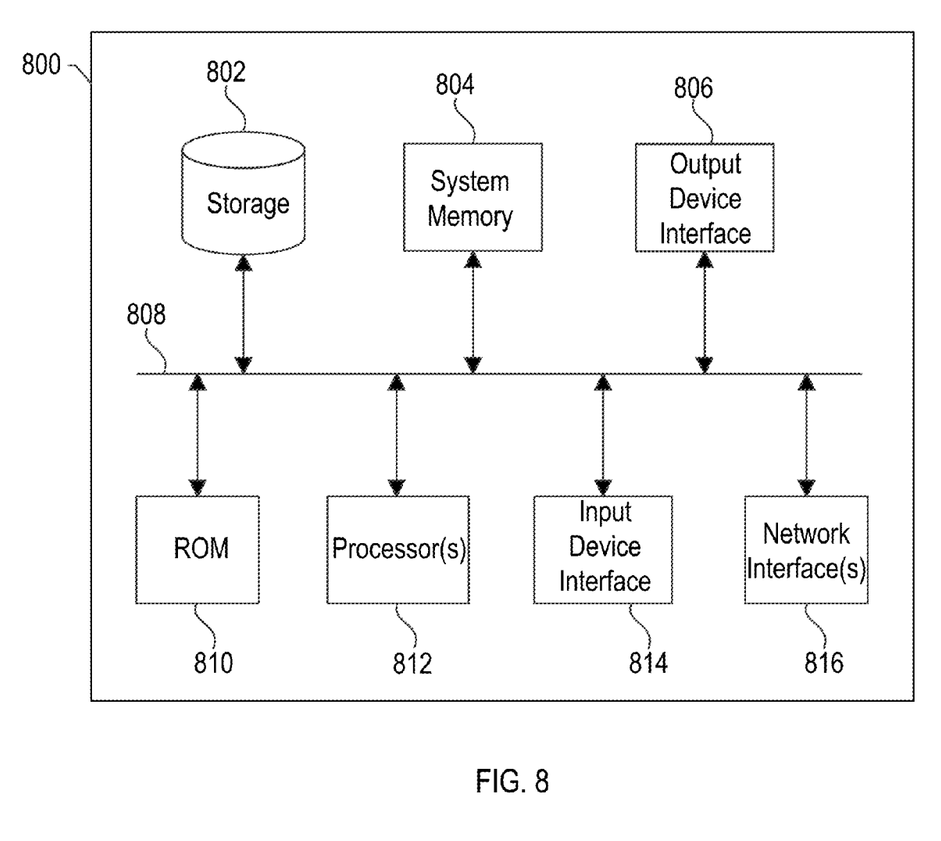
FIG. 8 conceptually illustrates an electronic system with which one or more implementations of the subject technology may be implemented.

FIG. 8 conceptually illustrates an electronic system 800 with which one or more implementations of the subject technology may be implemented. The electronic system 800, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 800 can be, and/or can be a part of, the network device 110, and/or one or more of the electronic devices 102A-C. Such an electronic system includes various types of computer readable media and interfaces for various other types of computer readable media. The electronic system 800 includes a bus 808, one or more processor(s) 812, such as the processor 206, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 retrieve instructions to execute and data to process in order to execute the processes of the subject disclosure. The one or more processor(s) 812 can be a single processor or a multi-core processor in different implementations.

The ROM 810 stores static data and instructions that are needed by the one or more processor(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processor(s) 812 may need at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, bus 808 also couples electronic system 800 to one or more networks (not shown), one or more electronic devices 102A-C, and/or content server 112, through one or more network interface(s) 816. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 800 can be a part of one or more networks of computers (such as a local area network ("LAN"), a wide area network ("WAN"), or an Intranet, or a network of networks, such as the Internet. Any or all components of electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of hierarchical hashing for longest prefix matching, the method comprising:
    storing prefixes and associated next hop information in hash tables that are associated with lengths of the prefixes, at least one of the hash tables storing a plurality of the prefixes having a plurality of the lengths;
    determining a first hash table of the hash tables that stores a largest number of the prefixes relative to the hash tables and a second hash table of the hash tables that stores a next largest number of the prefixes relative to the hash tables;
    receiving a destination address associated with a packet;
    determining the next hop information associated with a longest prefix that matches the destination address by searching at least the first hash table of the hash tables and, if the next hop information cannot be determined from searching the first hash table of the hash tables, searching the second hash table of the hash tables responsive to determining that the next hop information cannot be determined from searching the first hash table of the hash tables; and
    routing the packet based at least in part on the next hop information.

2. The method of claim 1, wherein determining the next hop information associated with the longest prefix that matches the destination address by searching at least the first hash table of the hash tables further comprises:
    retrieving a hash value from the first hash table by searching the first hash table using at least a portion of the destination address, wherein the hash value comprises a prefix data structure comprising a plurality of prefixes or a first pointer thereto and a next hop information data structure comprising a plurality of next hop information items or a second pointer thereto;
    determining the longest prefix of the prefix data structure that matches the destination address; and
    retrieving the next hop information from the next hop information data structure based at least on the longest prefix of the prefix data structure that matches the destination address.

3. The method of claim 2, wherein the prefix data structure is stored in the first hash table and comprises at least one of a bitmap or a binary tree and the next hop information data structure is stored in the first hash table and comprises an associated array.

4. The method of claim 2, wherein the hash tables are stored in random access memory and the prefix data structure is stored in ternary content-addressable memory.

5. The method of claim 2, wherein a length of the portion of the destination address is equivalent to a shortest length associated with the first hash table.

6. The method of claim 1, wherein the first hash table stores the plurality of the prefixes having the plurality of the lengths.

7. The method of claim 1, wherein determining the next hop information associated with the longest prefix that matches the destination address by searching at least the first hash table of the hash tables, further comprises:
 retrieving a first hash value from the first hash table by searching the first hash table using at least a first portion of the destination address, wherein the first hash value comprises an indicator that indicates whether the longest prefix that matches the destination address may exist in the second hash table of the hash tables that is associated with longer prefixes than the first hash table;
 searching the second hash table using at least a second portion of the destination address that includes the first portion of the destination address, when the indicator indicates that the longest prefix that matches the destination address may exist in the second hash table; and
 retrieving the next hop information from a second hash value returned from the second hash table when searching the second hash table using at least the second portion of the destination address returns the second hash value, otherwise retrieving the next hop information from the first hash value.

8. The method of claim 7, wherein a first length of the first portion of the destination address is equivalent to a shortest prefix length associated with the first hash table and a second length of the second portion of the destination address is equivalent to a shortest prefix length associated with the second hash table, the first and second hash tables each being associated with a separate plurality of the lengths of the prefixes.

9. The method of claim 7, wherein the first hash value further comprises a bitmap and an associated array and retrieving the next hop information from the first hash value further comprises:
 determining an index of the bitmap that corresponds to the longest prefix that matches the destination address; and
 retrieve the next hop information from the associated array based at least on the index.

10. The method of claim 1, wherein determining the next hop information associated with a longest prefix that matches the destination address by searching at least the first hash table of the hash tables further comprises:
 determining that no entries of the first hash table match at least a first portion of the destination address by searching the first hash table using the at least the first portion of the destination address;
 retrieving a hash value from the second hash table by searching the second hash table using at least a second portion of the destination address, wherein the hash value comprises a prefix data structure or a first pointer thereto and a next hop information data structure or a second pointer thereto;
 determining the longest prefix of the prefix data structure that matches the destination address; and
 retrieving the next hop information from the next hop information data structure based at least on the longest prefix of the prefix data structure that matches the destination address.

11. The method of claim 10, wherein the first portion of the destination address is longer than the second portion of the destination address.

12. The method of claim 10, wherein the first portion of the destination address is shorter than the second portion of the destination address.

13. A network device comprising:
 a memory configured to store hash tables comprising prefixes and associated next hop information, wherein the hash tables are associated with lengths of the prefixes and at least one of the hash tables storing multiple of the prefixes having multiple of the lengths of the prefixes;
 a processor configured to:
  determine a first hash table of the hash tables that stores a largest number of the prefixes relative to the hash tables and a second hash table of the hash tables that stores a next largest number of the prefixes relative to the hash tables;
  determine a destination address associated with a packet received over a first port of a plurality of ports;
  determine the next hop information associated with a longest prefix that matches the destination address by searching at least the first hash table of the hash tables and, if the next hop information cannot be determined from the first hash table of the hash tables, searching the second hash table of the hash tables upon determining that the next hop information cannot be determined from the first hash table of the hash tables; and
  prepare the packet for transmission over a second port of the plurality of ports, the second port being determined based at least on the next hop information.

14. The network device of claim 13, wherein the memory comprises at least one random access memory and at least one ternary content-addressable memory, the at least one random access memory storing the hash tables and the at least one ternary content-addressable memory storing prefix data structures referenced by hash values of the hash tables.

15. The network device of claim 13, wherein the processor is further configured to:
 receive a prefix and an associated next hop information;
 determine that the second hash table of the hash tables is associated with a length of the prefix; and
 add the prefix and the associated next hop information to the second hash table if the second hash table is associated with a longest prefix length.

16. The network device of claim 15, wherein the processor is further configured to:
 retrieve a hash value from the second hash table by searching the second hash table with a portion of the prefix that corresponds to a shortest prefix length associated with the second hash table, wherein the hash value comprises a prefix data structure and a next hop information data structure; and
 add the prefix to the prefix data structure and the associated next hop information to the next hop information data structure.

17. The network device of claim 15, wherein the processor is further configured to:

determine that a first hash value does not exist in the second hash table for a portion of the prefix that corresponds to a shortest prefix length associated with the second hash table;

generate a second hash value that includes a prefix data structure that comprises the prefix and a next hop information data structure that comprises the next hop information; and add the second hash value to the second hash table in association with the portion of the prefix that corresponds to the shortest prefix length associated with the second hash table.

18. The network device of claim 13, wherein the memory comprises random access memory.

19. A computer program product comprising instructions stored in a tangible non-transitory computer-readable storage medium that when executed by a processor cause the processor to perform operations, the instructions comprising:

instructions to receive a prefix and an associated next hop information;

instructions to determine a hash table of a plurality of hash tables that is associated with a length of the prefix, the plurality of hash tables being associated with prefix lengths, a first hash table of the plurality of hash tables having been determined to store a largest number of a plurality of prefixes relative to the plurality of hash tables, and a second hash table of the plurality of hash tables having been determined to store a next largest number of the plurality of prefixes relative to the plurality of hash tables, wherein the second hash table of the plurality of hash tables is searched for a longest prefix match responsive to determining that the longest prefix match cannot be found by searching the first hash table of the plurality of hash tables;

instructions to determine whether a hash value exists in the hash table for a portion of the prefix that corresponds to a shortest prefix length associated with the hash table;

instructions to retrieve the hash value from the hash table for the portion of the prefix when the hash value exists in the hash table, wherein the hash value comprises a prefix data structure and a next hop information data structure; and instructions to store the prefix in the prefix data structure of the hash value and for storing the associated next hop information in the next hop information data structure.

20. The computer program product of claim 19, wherein the instructions further comprise:

instructions to generate a second hash value that includes a prefix data structure that comprises the prefix and a next hop information data structure that comprises the next hop information when the hash value does not exist in the hash table; and instructions to add the second hash value to the hash table in association with the portion of the prefix that corresponds to the shortest prefix length associated with the hash table.

21. The computer program product of claim 19, wherein the prefix data structure comprises a bitmap or a binary tree.

* * * * *